Oct. 16, 1951  J. M. GOLDBERG  2,571,440
FISHING REEL
Filed Aug. 29, 1949  2 Sheets-Sheet 1
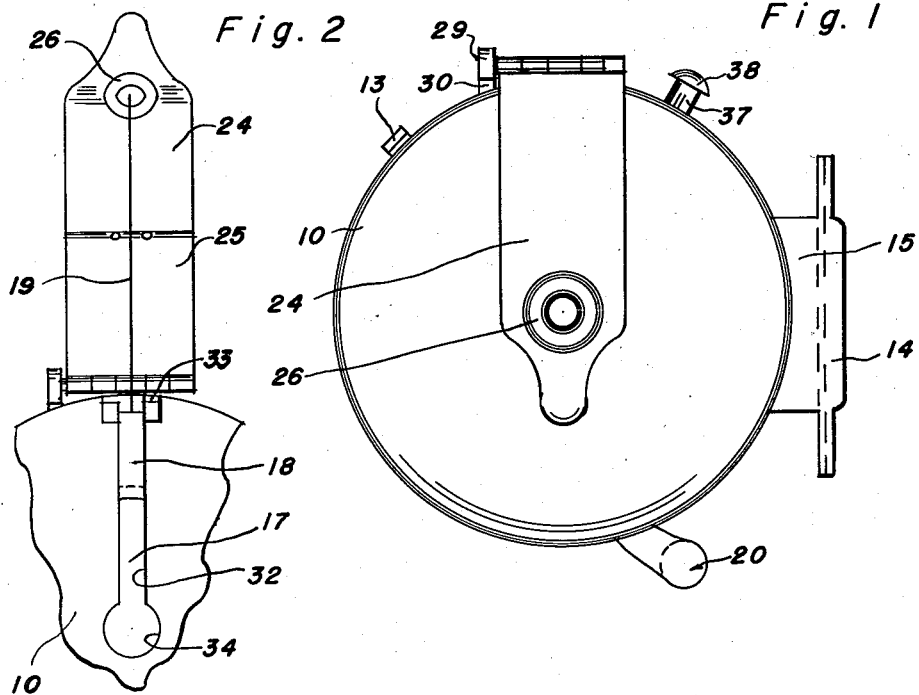
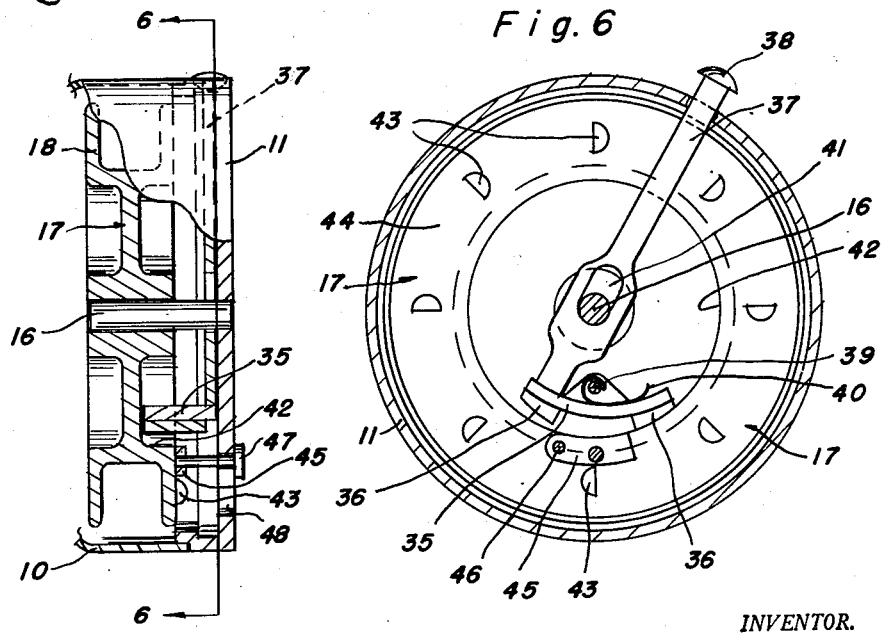
INVENTOR.
BY JACOB M. GOLDBERG
Bertha L. MacGregor
attorney Oct. 16, 1951 — J. M. GOLDBERG — 2,571,440
FISHING REEL
Filed Aug. 29, 1949 — 2 Sheets-Sheet 2

INVENTOR.
BY JACOB M. GOLDBERG
Bertha L. MacGregor
Attorney

Patented Oct. 16, 1951

2,571,440

UNITED STATES PATENT OFFICE 2,571,440

FISHING REEL

Jacob M. Goldberg, Denver, Colo.

Application August 29, 1949, Serial No. 113,011

3 Claims. (Cl. 242—84.5)

This invention relates to fishing reels, and the main object of the invention is to produce a reel which is efficient in operation, simple in construction and compact in form.

Another object is to provide improved means for guiding and controlling the line for the purposes of casting, playing out and retrieving the line as required in the art of fishing.

An important advantage of my improved reel is the construction whereby I produce absolutely free, frictionless passage of the line from the spool and its casing for purposes of casting, and controlled playing out of the line without backlash for the purpose of landing the fish after the bait has been taken.

These and other advantages of the construction will be apparent from the drawings and the following description.

In the drawings:

Fig. 1 is an elevational view showing one side or face of a fishing reel embodying my invention, with the line guide in casting position.

Fig. 2 is a fragmentary elevational view of the same, with the line guide in position for either playing out or retrieving the line.

Fig. 5 is a transverse sectional view of the line carrying spool and part of the casing, showing the brake mechanism and noise making means.

Fig. 6 is a sectional view taken in the plane of the line 6—6 of Fig. 5, showing the brake mechanism and noise making means in elevation.

Figure 3:
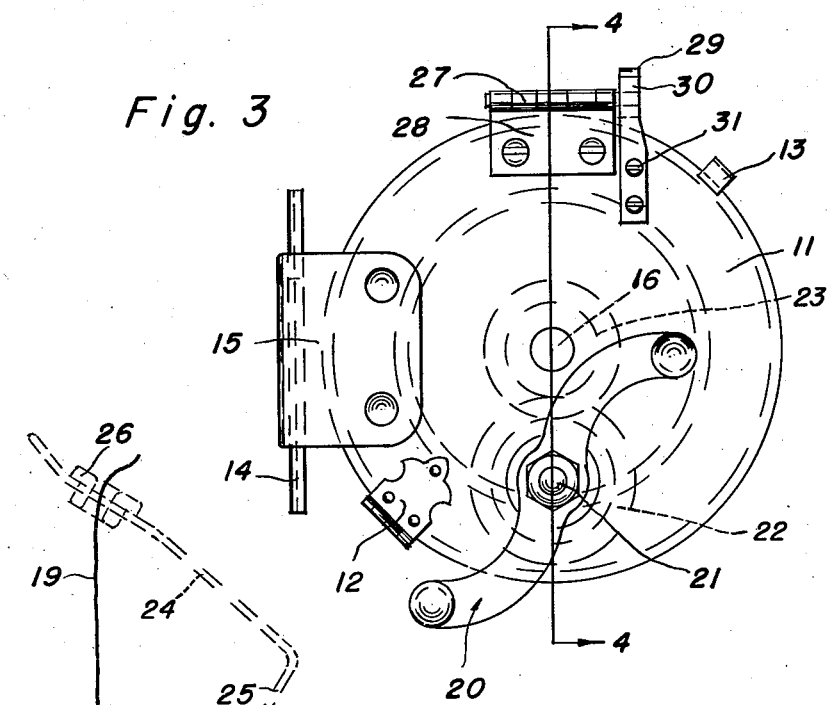
Fig. 3 is an elevational view of the opposite side of the reel, with the line guide in casting position, showing part of the internal mechanism in dotted lines.

The fishing reel of my invention comprises a casing consisting of two members, 10 and 11, hinged together at their peripheral edges by a hinge 12 and held in closed position by a spring latch 13. A rod rest 14 is secured to the casing member 11 by a bracket 15. A spindle 16 is concentrically and rotatably mounted in the casing member 11. A spool 17 is keyed to the spindle 16 to rotate therewith. Said spool 17 has spaced apart flanges 18 between which the line 19 is retained on the spool.

Means for rotating the spool 17 comprises a two armed handle 20 fixed midway between its ends to a shaft 21 rotatably and eccentrically mounted in the housing member 11, said shaft 21 projecting into the casing and the handle 20 being closely adjacent the outer face of the casing member 11. A gear 22 is fixed on the inner end of the shaft 21 to mesh with a gear 23 keyed to the spool spindle 16. Manual rotation of the handle 20 transmits rotary motion to the shaft 21, and through gears 22 and 23 to the spindle 16 for the purpose of rotating the spool 17.

Line guide means comprises a flat, thin strip of metal bent between its ends to provide two portions indicated at 24 and 25, disposed substantially at right angles to each other. The portion 24 of the line guide is provided with a grommet 26 near its free end and the free end is curved to provide a finger hold. The portion 25 is hinged at its free end edge by a pin 27 and hinge plates 28 to the casing member 11. In order to hold the line guide in one of its two positions, I have provided a cam 29 fixed on one end of the hinge pin 27, the cam being engaged by a flat spring 30 secured at one end by screws 31 to the casing 11.

Cooperating with the hinged line guide means is a slot 32 in the casing member 10. The slot 32 extends continuously through the peripheral portion 33 of the casing 10 opposite the space between the flanges 18 of the spool 17, and radially across the face of the casing member 10 to the enlarged opening 34 in the center of the casing 10 in alignment with the spool spindle 16.

Figure 4:
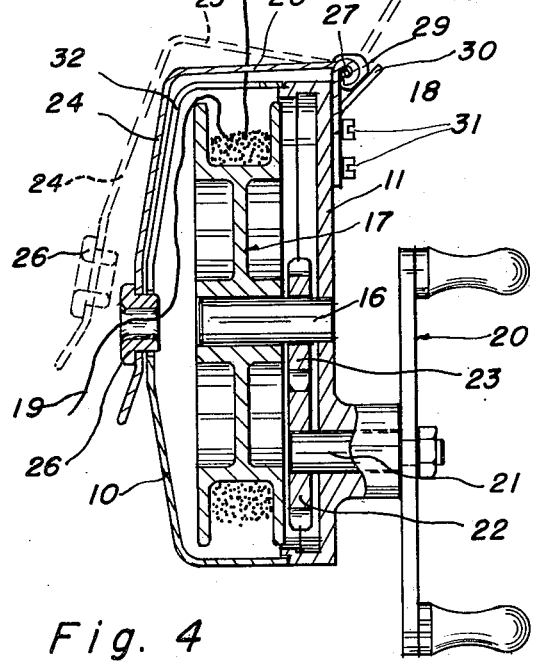
Fig. 4 is a sectional view taken in the plane of the line 4—4 of Fig. 3, and indicating in dotted lines the movement of the line guide from casting position to playing out or retrieving position.

When the line guide is in the position shown in Figure 1 and in solid lines in Fig. 4, the grommet 26 registers with the opening 34 in the casing member 10. When the line guide is in the fully extended position shown in dotted lines in Fig. 4, the grommet 26 is opposite the peripheral portion of the spool 17, that is radially beyond the flanges 18 of the spool on which the line 19 is wound. The operation of these parts will be explained hereinafter.

Brake mechanism for controlling the freedom of rotation of the spool 17 is best shown in Figs. 5 and 6. It comprises a brake shoe 35 provided with brake lining 36, controlled by a manually operable brake lever 37 terminating in a button 38 on the end projecting from the housing 11. The brake shoe 35 is pivotally mounted on the reel by a pivot pin 39 controlled by the flat spring 40. The brake lever 37 is provided between its ends with an elongated slot 41 and is mounted on the spindle 16 which extends through said slot 41, so the lever 37 is longitudinally movable when the button 38 is pressed inwardly, causing the brake lining 36 to engage the annular shoulder 42 formed on the spool 17. The spring 40 urges the brake shoe 35 away from the surface 42 when pressure is released on the button 38.

Noise making mechanism consists of a series of protuberances 43 formed by cutting the metal of the spool flange and bending the perforated portions outwardly. These protuberances 43 are engaged by a contact clip 45 pivoted at 46 to the casing and controlled by the noise button 47 which extends through the casing 11 and has its inner end attached to the contact clip 45. By pushing the button 47 to move it in the slot 48 toward the periphery of the casing 11, the clip 45 engages the protuberances 43 on the spool flange when the spool 17 is rotated.

*Operation.*—For casting, the fisherman usually holds the reel with the rod rest 14 uppermost, and the handle 20 and casing member 11 facing his right hand. The hinged line guide device 24, 25 is positioned as shown in Fig. 1, with the portion 24 engaging the casing 10 and the eyelet 26 registering with the central opening 34 in said casing 10. The line 19 is thus guided from the spool 17 to the opening 34, and through eyelet 26, as shown in solid lines in Fig. 4. In this "casting" position of the line guide, the line 19 is drawn from the spool freely, without rotation of the spool, and without frictional hindrance of any kind. As shown in Fig. 4, the line passes from the space between the flanges 18 of the spool, over the edge of the flange adjacent the casing 10, through the space between the inner face of said casing 10 and the side of the spool, through the opening 34 and grommet 26. The form and arrangement of these parts is such that the line is not subjected to any friction as it passes from the spool outwardly through the grommet for effortless casting.

When a fish has taken the bait, the fisherman moves the line guide to the extended position shown in Fig. 2 and in dotted lines in Fig. 4, wherein the grommet 26 is radially opposite the peripheral portion of the spool 17 and the line 19 cannot be drawn from the spool without rotation thereof. The spool 17 rotates in one direction when the line is "played out" or drawn from the spool by the effort of the fish moving away from the reel. Such rotation of the spool results in imparting rotary motion to the gears 23 and 22, and through them to the handle 20. This result produces a braking effect on the rotation of the spool, produces controlled "playing out" of the line and avoids any recoil or "backlash" which is undesirable when trying to land the fish.

When it is desired to retrieve the line 19, the fisherman operates the handle 20 to rotate the spool in the direction required for winding the line on the spool. During this operation, the line guide is maintained in the extended position shown in Fig. 2 and in dotted lines in Fig. 4, as previously described, the line being guided from the grommet 26 in the hinged guide member 24 to the periphery of the spool between the flanges 18 thereof.

If braking of the spool rotation is desired, in addition to that exerted by the gearing when the spool is rotated by drawing out of the line by the efforts of the fish, the fisherman may resort to the brake mechanism controlled by the brake button 38. By pressing on the brake button 38, he is able to retard the rotation of the spool and to control playing out of the line to a fine degree.

Likewise, the noise making means may be rendered operative or inoperative as desired by the control button 47, as will be understood from the previous description.

Changes may be made in the form and details of construction of my fishing reel without departing from the scope of my invention as set forth in the appended claims.

I claim:

1. A fishing reel comprising a casing provided with a continuous slot which extends through the peripheral and a side wall of the casing to the center of the casing side wall, a spindle rotatably mounted in the casing wall opposite said slotted wall, a line carrying spool mounted on and rotatable with said spindle, a shaft parallel to the spindle rotatably mounted in the casing, a handle on the shaft, gearing between said shaft and spindle, line guide means comprising an arm hingedly mounted on the casing, the free end of the arm having a grommet therein through which the line passes, said guide means being movable to a position wherein it engages the casing, the grommet registers with the slot in the center of the side wall of the casing and the line extends over one side of the spool through said casing opening and grommet, and movable to another position wherein it extends radially from the casing, the grommet is radially opposite the slot in said peripheral wall of the casing and the line extends from the periphery of the spool through said slotted peripheral portion of the casing and radially through said grommet, withdrawal of the line from the spool when the line guide is in the latter position imparting rotary motion to said spool, gearing and handle, and brake means for retarding the rotation of the spool, said brake means comprising a brake lever which extends through the casing and has an elongated slot between its ends through which said spindle extends, a brake shoe pivotally mounted on the side of the spool and connected to said lever, and spring means for normally holding the brake shoe out of engagement with said spool.

2. A fishing reel comprising a casing provided with a continuous slot which extends through the peripheral and a side wall of the casing to the center of the casing side wall, a spindle rotatably mounted in the casing wall opposite said slotted wall, a line carrying spool mounted on and rotatable with said spindle, a shaft parallel to the spindle rotatably mounted in the casing, a handle on the shaft, gearing between said shaft and spindle, line guide means comprising an arm hingedly mounted on the casing, the free end of the arm having a grommet therein through which the line passes, said guide means being movable to a position wherein it engages the casing, the grommet registers with the slot in the center of the side wall of the casing and the line extends over one side of the spool through said casing opening and grommet, and movable to another position wherein it extends radially from the casing, the grommet is radially opposite the slot in said peripheral wall of the casing and the line extends from the periphery of the spool through said slotted peripheral portion of the casing and radially through said grommet, withdrawal of the line from the spool when the line guide is in the latter position imparting rotary motion to said spool, gearing and handle, a series of protuberances on the side of the spool located in an annular path, a contact member pivotally mounted on the casing, and a noise control member adapted to contact said pivoted contact member for moving said member into and out of the annular path of said protuberances.

3. A fishing reel comprising a casing having opposite side walls and a peripheral wall connecting said side walls in spaced relationship, said casing being provided with a continuous slot which extends through the peripheral and a side wall of the casing, a line carrying spool rotatably mounted in the casing, means for manually rotating the spool, and line guide means comprising an arm bent between its ends to form a portion substantially parallel to the peripheral wall of the casing and another portion substantially parallel to the slotted side wall of the casing, a hinge pin rotatably mounted on the casing adjacent said peripheral wall, the guide arm being connected to said hinge pin to pivot therewith, a cam on the hinge pin, and a spring secured to the casing and bearing at its free end on said cam, the free end of the arm having a grommet therein through which the line passes, said arm being movable to a position wherein it overlies the peripheral wall and said slotted side wall of the casing and the grommet registers with the slot in said side wall, and pivotally movable to another position wherein the grommet is radially opposite the slot in said peripheral wall of the casing.

JACOB M. GOLDBERG.

REFERENCES CITED

The following references are of record in the file of this patent:

UNITED STATES PATENTS

| Number | Name | Date |
|---|---|---|
| 161,314 | Winans et al. | Mar. 23, 1875 |
| 1,341,519 | Reuze | May 25, 1920 |
| 2,055,451 | Case | Sept. 22, 1936 |
| 2,086,782 | Schafer | July 13, 1937 |
| 2,179,413 | Kolosso | Nov. 7, 1938 |
| 2,316,314 | Burdick | Apr. 13, 1943 |
| 2,327,469 | Teitsma | Aug. 24, 1943 |

FOREIGN PATENTS

| Number | Country | Date |
|---|---|---|
| 8,517 of 1910 | Great Britain | Jan. 26, 1911 |